Patented Apr. 11, 1944

2,346,508

UNITED STATES PATENT OFFICE 2,346,508

HYDROCHLORIDES OF AMINO-AZO-TOLUENES

Graham McGavock Richardson, Wilmington, Del., assignor to E. I. du Pont de Nemours & Company, Wilmington, Del., a corporation of Delaware No Drawing. Application October 11, 1941, Serial No. 414,595

4 Claims. (Cl. 260—205)

This invention relates to hydrochlorides of amino azo compounds which are especially useful as intermediates for the manufacture of azo dyes, and especially to a readily and completely diazotizable amino-azo-toluene hydrochloride body.

When toluidine is subjected to diazotization, an azo compound is formed in the acidified diazo medium which results from coupling the diazo with undiazotized toluidine, namely diazo-amino-toluene or its hydrochloride. Upon heating this acid mixture at about 40° C. for a sufficient time, the diazo-amino-toluene is converted to amino-azo-toluene or its hydrochloride. Heretofore such reactions have been carried out by using a quantity of the toluidine, such as ortho toluidine in excess of that required for the reaction. In order to recover the unused ortho toluidine, the reaction mixture was filtered after the rearrangement and washed free of acid. When this product was diazotized in the usual way, it was found that a large proportion thereof did not diazotize. This product would absorb hydrochloric acid when treated in a solution thereof, such as a solution of 4% to 5% hydrochloric acid at normal atmospheric temperatures, but most of the acid was volatilized upon drying and the product contained a large proportion of non-diazotizable material. The non-diazotizable portion of such products is deleterious to diazo combinations in that the insoluble portion is variable and it produces low yields in pigments, dyes and dyeings. The presence of such non-diazotizable material is especially deleterious in dyeings made by applying the diazo solution to a fabric which has been impregnated with a naphthol, such as beta naphthol. In this kind of dyeing, complete diazotization of the amino base is important in order to obtain uniform and maximum color yields. In order to utilize this type of compound advantageously, it was desirable to provide means whereby it could be conveniently and completely diazotized.

It is among the objects of the present invention to provide hydrochlorides of the amino-azo-toluenes which are readily and completely diazotizable. Another object of the invention is to provide processes for manufacturing such hydrochlorides. Other objects of the invention will be apparent from the following more detailed description.

The objects of the invention are attained in general by first producing amino-azo-toluene in the form of a wet filter cake. The solids thus obtained are treated with a hydrochloric acid solution of suitable concentration and at a suitable temperature to produce a form of hydrochloride which is readily diazotizable.

The invention will be more fully set forth in the following more detailed description which includes examples that are given as illustrative embodiments of the invention and not as limitations thereof. Parts are expressed in parts by weight unless otherwise noted.

Example 1

A wet press cake consisting of one hundred and thirty-two parts (86.5% amino-azo-toluene) was added to 1084 parts of 3.75% hydrochloric acid which had been heated to 95° C. The temperature of the mixture dropped to 90° C. and it was held at this temperature for five minutes. The mixture was then filtered and dried at 45° to 65° C. at normal atmospheric pressures. The dried product consisted of subdivided solids and contained 14% of hydrochloric acid which is the theoretical content of amino-azo-toluene hydrochloride.

The treatment with hydrochloric acid produced a marked change in the physical state of the solids in that there was a noticeable increase in the volume thereof. When the dried product was ground to pass a 60 mesh screen, it had a fluffy texture as compared to a dense texture which was produced by grinding the dried untreated press cake. When the product was diazotized in the usual manner by the action of nitrous acid, diazotization was rapid and complete, and no significant amount of insoluble material remained.

The amino-azo-toluene press cake was made as follows. A solution was made by adding 1 mol equivalent of ortho toluidine to a 31% hydrochloric acid solution containing 0.38 mol equivalents of hydrochloric acid. The mixture was cooled to 20 to 22° C. and 0.30 mol equivalent of sodium nitrite was added with stirring. When the diazotization was completed, the mixture was heated to 40° C. and held at this temperature until the diazo-amino-toluene present was transformed to amino-azo-toluene. The resulting thick mixture was then drowned in 5 to 6 times its volume of dilute hydrochloric acid solution (4% HCl) at 45° C. in order to bring the excess of undiazotized ortho toluidine into solution and form a precipitate of the amino-azo-toluene. A press cake of amino-azo-toluene was then obtained by filtration and by washing the filter with water to the absence of hydrochloric acid in the wash water. This wet press cake contained 86.5% of amino-azo-toluene and the remainder was substantially all water.

*Example 2*

One hundred and thirty parts of amino-azo-toluene press cake like that described in Example 1 were added to 1064 parts of 4.5% hydrochloric acid at 95° C. The temperature of the mixture dropped to 89° C. Heat was applied to bring the temperature back to 90° to 95° C. and the mixture was held at this temperature for 5 minutes, then cooled to 70° C. by adding ice. The mixture was filtered at 70° C. and the press cake was dried at 45° to 50° C. for 43 hours at atmospheric pressure. The dry product was ground and screened through a 60 mesh screen. A yield of 132 parts was obtained. The product contained 13.6% hydrochloric acid and no significant amount of insoluble material was present when it was diazotized. Complete diazotization of the product was easily and rapidly effected by processes commonly employed in the art.

*Example 3*

One hundred and thirty-two parts of amino-azo-toluene press cake like that used in Example 1 were added to 542.5 parts of 4.8% hydrochloric acid at 95° C. The temperature of the mixture dropped to 89° C. Heat was applied to bring the temperature up to 90° C. and the mixture was held at 90° C. for 5 minutes and then filtered by suction at 90° C. and dried for 44 hours at 45° C. After grinding to pass a 60 mesh screen, the yield was 115 parts of product containing 14% hydrochloric acid. Upon diazotization the product was rapidly soluble and there was no significant amount of insoluble material.

Various modifications of the invention are permissible. The concentration of the hydrochloric acid treating agent can be varied from about 2% to about 10%. Higher or lower concentrations of hydrochloric acid give such high proportions of insoluble material in the diazotization bath that they cannot be used satisfactorily to produce dyes and dyeings. The temperature of treating with hydrochloric acid can also be varied from about 80° C. to the boiling point of the mixture under normal atmospheric conditions. Temperatures lower than 80° C. produce products which do not completely diazotize and the proportion of insoluble material begins to increase rapidly with treating temperatures below 80° C. The best results are obtained by treating with hydrochloric acid of about 3% to about 5% strength and at a temperature of about 90° C. to about 100° C. With such strengths of acid and at such temperatures, products were obtained which had no significant amount of insoluble material upon diazotization.

Such diazotization tests were carried out by suspending 5 grams of the product in a mixture consisting of 5 milliliters hot water and 3.75 milliliters of concentrated hydrochloric acid. The mixture was stirred until all the amino-azo-toluene became wet and then the mixture was cooled by adding 50 grams of ice in 50 grams of ice water. One and four-tenths gram of sodium nitrite was added and the mixture was stirred for 30 minutes whilst maintaining the temperature below 10° C. The resulting solution was then filtered and the insoluble material on the filter was dried and weighed.

The treatment of amino-azo-toluene with hydrochloric acid under the indicated conditions of temperature and concentration must continue long enough to permit the formation of the hydrochloride. About five minutes is commonly satisfactory but a longer or a shorter treatment can be used. Instead of treating a wet press cake of amino-azo-toluene with the hydrochloric acid solution, a dried press cake can be used. The diazo mixture, after heating at about 40° C. to transform the diazo-amino-toluene to amino-azo-toluene, can also be used. Accordingly such a mixture can be drowned in a hot solution of hydrochloric acid of sufficient strength to give a residual hydrochloric acid medium of the required concentration and temperature. The resulting mixture can then be held within the required temperature range until the hydrochloride is formed and then filtered. It is not essential to add the amino-azo-toluene to a heated acid bath so long as the bath is eventually heated to the above indicated range for a sufficient time to form the hydrochloride. At least five parts of 3% to 5% hydrochloric acid is desirable but more can be used.

From the foregoing disclosure it will be recognized that the invention is susceptible of modification without departing from the spirit and scope thereof and it is to be understood that the invention is not restricted to the specific illustrations thereof herein set forth.

I claim:

1. The process which comprises treating amino-azo-toluene with about 2% to about 10% hydrochloric acid and at a temperature of about 80° to about 100° C. until a hydrochloride is formed which has a lower density and a higher diazotization value when it is dried at an elevated temperature and at atmospheric pressure than an amino-azo-toluene which is treated in said acid solution at a lower temperature and dried, the quantity of said acid being at least sufficient to form said lower density hydrochloride.

2. The process in accordance with claim 1 in which a wet press cake of amino-azo-toluene is treated.

3. The process in accordance with claim 1 in which the amino-azo-toluene is derived from ortho-toluidine, and the treating medium consists of about 3% to about 5% hydrochloric acid at about 90° to about 100° C.

4. The process in accordance with claim 1 in which a wet press cake of amino-azo-toluene is treated at about 90° to about 100° C. for about 5 to about 15 minutes in a 3% to 5% hydrochloric acid solution, and the product is dried at about 45° to about 65° C. at normal atmospheric pressures.

GRAHAM McGAVOCK RICHARDSON.